United States Patent [19]
Tsukada

[11] Patent Number: 5,390,557
[45] Date of Patent: Feb. 21, 1995

[54] LINEAR GUIDE SYSTEM WITH INTEGRALLY FORMED RACK

[75] Inventor: Toru Tsukada, Maebashi, Japan

[73] Assignee: NSK Ltd., Tokyo, Japan

[21] Appl. No.: 95,012

[22] Filed: Jul. 22, 1993

[30] Foreign Application Priority Data

Aug. 11, 1992 [JP] Japan ..................... 4-056507[U]

[51] Int. Cl.⁶ ................. F16H 19/04; F16C 29/06
[52] U.S. Cl. ..................... 74/89.17; 74/422; 384/45
[58] Field of Search ............... 74/89.17, 422, 479 PH; 384/43, 45

[56] References Cited

U.S. PATENT DOCUMENTS

| | | | |
|---|---|---|---|
| 3,866,484 | 2/1975 | Dreshman | 74/422 |
| 4,576,421 | 3/1986 | Teramachi | 384/45 |
| 4,943,169 | 7/1990 | Kasai | 384/45 X |
| 5,106,206 | 4/1992 | Tanaka | 384/45 |

FOREIGN PATENT DOCUMENTS

| | | | |
|---|---|---|---|
| 59-23151 | 2/1984 | Japan | 74/89.17 |
| 59-103925 | 7/1984 | Japan | |
| 2-43519 | 3/1990 | Japan | |

*Primary Examiner*—Allan D. Herrmann
*Attorney, Agent, or Firm*—Shapiro and Shapiro

[57] ABSTRACT

In order to provide a linear guide system having rolling grooves on both sides and an integrally formed rack, which can be used with either a guide rail or sliders fixed and in which the direction of the deflection of the rail with its self-weight is different from the direction of vibration caused by movement of the rack, rack teeth are integrally formed in one of the side surfaces of the guide rail on which rolling grooves for rolling members are formed so that the direction of the tooth traces of the rack teeth is orthogonal to the direction along which the rolling grooves for the rolling members of the guide rail are formed. Accordingly, vibration of the rack does not overlap with the deflection of the rail, thereby producing good effects on prolongation of the life of the rack, prevention of the noise and improvement of precision in positioning. Note that, this system can be used both with the rail fixed and with the sliders fixed.

11 Claims, 3 Drawing Sheets

LINEAR GUIDE SYSTEM WITH INTEGRALLY FORMED RACK

BACKGROUND OF THE INVENTION

1. Field of the Invention

The present invention relates to a linear guide system with an integrally formed rack, in which the rack which constitutes part of a rack and pinion mechanism serving as a linear drive mechanism and a linear guide system serving as a linear guide mechanism are integrated with each other.

2. Related Background Art

Conventionally, a rack constituting a drive mechanism and a linear guide system serving as a guide mechanism are separately manufactured, and then assembled into the above-mentioned kind of integrally formed linear guide system which is used in a robot or other kinds of machines. As the separately manufactured mechanisms are assembled, however, good assembly precision is hard to obtain. Thus, the rack may bite excessively or rack clearance may become too large, thereby shortening the life of the rack and generating a noise. In order to solve these problems, a rack linear guide system is proposed in Japanese Utility Model Appln. Laid-Open No. 2-43519, in which rack teeth 4 are integrally formed on a surface of a guide rail on which grooves for rolling members are not formed, as shown in FIG. 4.

In the proposed system, however, holes for fixing bolts can not be formed at predetermined intervals over the overall length in the longitudinal direction, thereby causing the following problems.

① When the guide rail 31 needs to be bolted to a machine base, or the like, the system can not be used.

② When sliders 2 which engage with the guide rail 31 so that they can move relatively to the guide rail 31 are fixed in order to linearly drive the guide rail 31 with respect to the sliders 2, that is, when the guide rail 31 does not have to be fixed to the machine base, a hole $B_{31}$ for a fixing bolt is required to fix a component to the movable guide rail. In this case, a surface 4A in which the hole for the fixing bolt is worked should be provided at an end of the rack teeth 4, whereby the rail becomes longer and manufacture thereof becomes more difficult. Thus, an increase in manufacturing costs will occur.

③ The rack teeth 4 engage with a pinion 12 with their faces set to the upside or the down side because of facility in designing the relation between the pinion with which the rack teeth 4 engage and a rotational drive mechanism of the pinion 12. Therefore, engagement of the rack teeth 4 with the pinion 12 has to be adjusted in the vertical direction, which is more difficult than the adjustment in the horizontal direction. In addition both the direction of the deflection of the rail caused by its self-weight and that of the vibration caused by movement of the rack engaging with the pinion 12 coincide with the vertical direction, thereby shortening the life of the rack, generating a noise, making positioning more difficult, and causing other problems.

Incidentally, a system in which a guide rail has rolling groove(s) for rolling members in one side surface and a rack integrally formed in the opposite side surface has been disclosed in Japanese Utility Model Appln. Laid-Open No. 59-103925. This system is, however, supposed to employ a pair of said guide rails, and its application is considerably limited. Thus such a system is different from the linear guide system of the present invention in which sliders straddle the guide rail so as to move relatively to the guide rail.

SUMMARY OF THE INVENTION

A principal object of the present invention is to provide a linear guide system with an integrally formed rack which can solve the above-mentioned problems in conventional and previous systems, and in which holes for fixing bolts can be arbitrarily formed over the overall length of a guide rail in the longitudinal direction.

The present invention relates to a linear guide system comprising: a guide rail having rolling grooves for rolling members elongated in the axial direction in both side surfaces; sliders which straddle the guide rail so as to slide thereon, and each of which consists of a slider main body having rolling grooves for the loaded rolling members in the inner side surfaces facing the rolling grooves for the rolling members of the guide rail and return paths for the rolling members provided inside the slider in parallel with said respective rolling grooves for the loaded rolling members, and end caps attached to both ends of the slider main body which have half-circular-arc-shaped curved paths for communicating said return paths for the rolling members with said rolling grooves for the loaded rolling member in order to form endless circulation paths; and a multitude of the rolling members which are fit between the rolling grooves for the rolling members and the rolling grooves for the loaded rolling members and circulate in said endless circulation paths, wherein rack teeth are formed in the axial direction on a side surface of the guide rail which is parallel with the side surfaces on which the rolling grooves for the rolling members are formed, and the direction of the tooth traces of the rack teeth is orthogonal to the direction of the rolling grooves for the rolling members of the guide rail.

Since the rack teeth, which are driven components in the linear drive mechanism, are directly worked on the side surface of the guide rail of the linear guide system so that the direction of the teeth traces is orthogonal to the direction of the rolling grooves for the rolling members of the guide rail, the following effects can be obtained.

① The rack teeth which are integrally worked can have high precision. The system does not rattle in operation. So, the life of the rack can be prolonged and the noise can be reduced.

② As the rolling grooves for the rolling members and the rack is formed on the same surface, holes for fixing the rail can be formed in the other surfaces. Accordingly, the rail can be stably fixed to the base and vibration trembling of the rail caused by engagement of the rack with the gear can be prevented, thereby obtaining stable performance even at a high speed.

③ The surface on which the rack is formed does not have to be elongated to provide the hole(s) for fixation. And the length of the rail can be shortened while the length of the rack teeth remains the same. Accordingly, less space is required for installation, and rigidity of the rail becomes greater.

④ It is easy to make the direction of the deflection of the rail with its self-weight differ from the direction of the tooth traces of the rack with the gear. Accordingly, engagement of the rack with the gear can be uniform in the entire strokes, thereby prolonging the life, reducing noise as well as improving precision of positioning.

DESCRIPTION OF THE PREFERRED EMBODIMENTS

The embodiments of the present invention will be described below with reference to the drawings.

Figure 1:
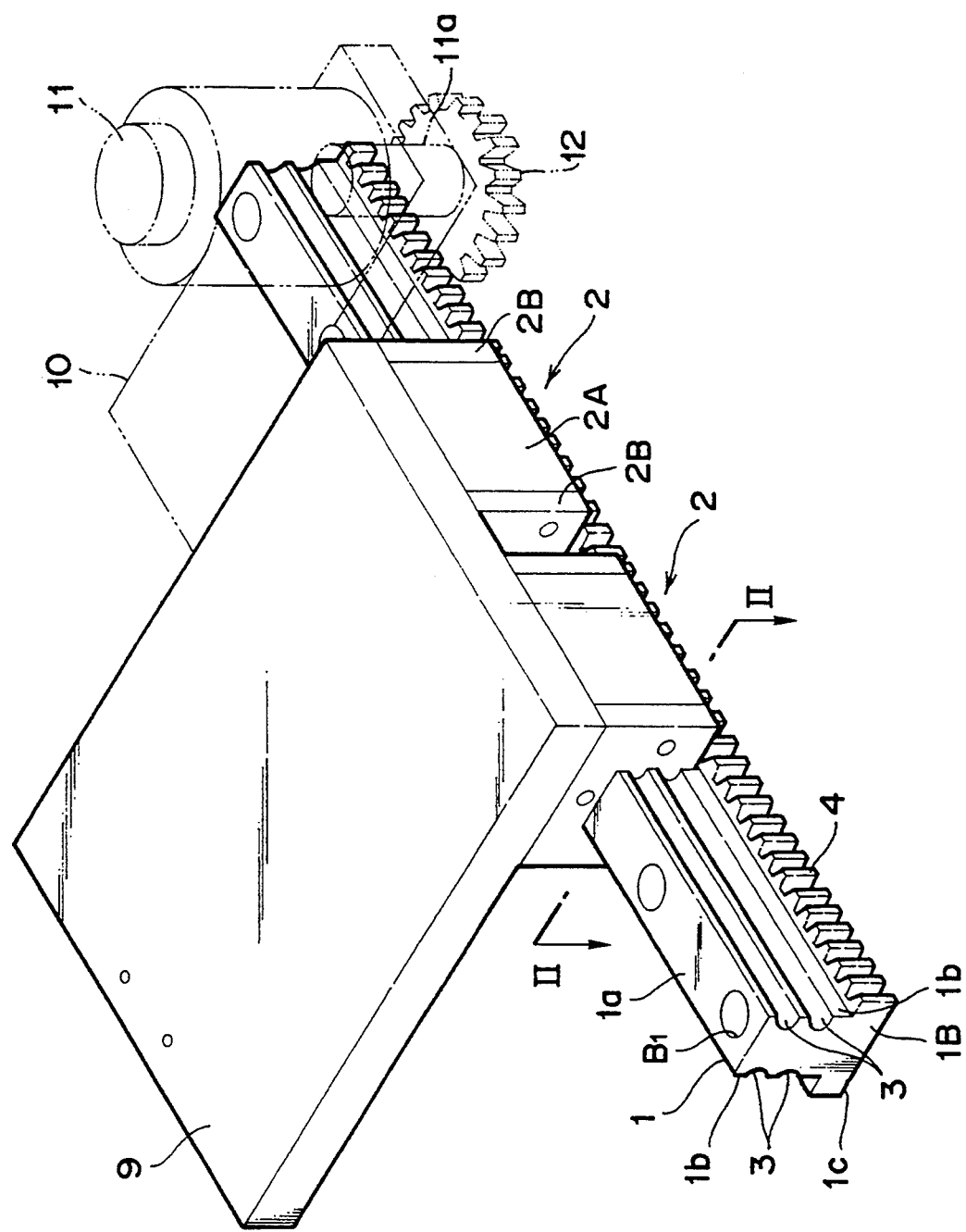
FIG. 1 is a perspective view of the first embodiment of the linear guide system with the integrally formed rack according to the present invention.
Figure 2:
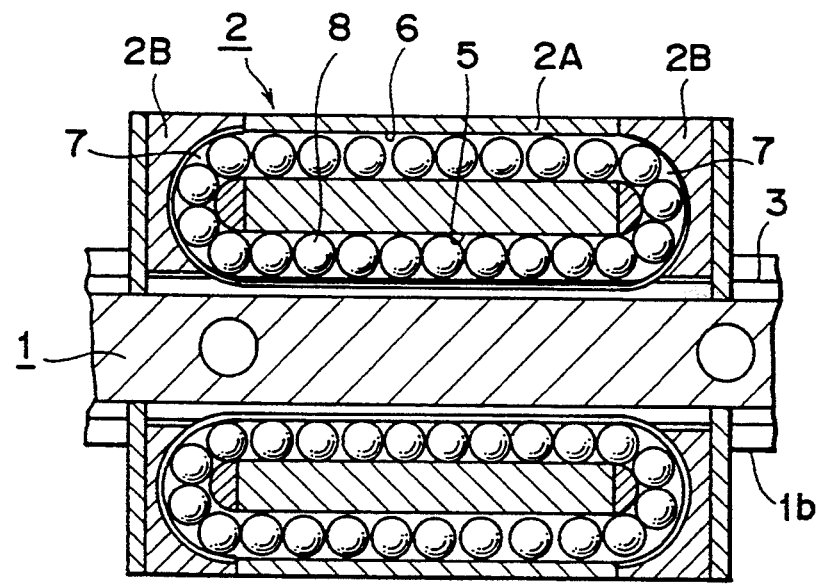
FIG. 2 is a cross-sectional view cut along II—II shown in FIG. 1.

FIG. 1 is a perspective view of an embodiment of the linear guide system with the integrally formed rack according to the present invention. FIG. 2 is a cross-sectional view of the same. Rolling grooves 3A for rolling members, having arch-shaped cross-sections and elongated in the axial direction of a guide rail 1 having an inverted-T-shaped cross-section, are provided symmetrically on the both side surfaces 1b of said guide rail 1. In the lower part of one of said side surfaces 1b (that is, in the side edge surface of a rail base portion 1B extending sideward from the inverted T), rack teeth 4 are integrally formed substantially over the overall length of the rail so as to be parallel with the rolling grooves 3 for the rolling members. The rack teeth 4 are formed so that the direction of their tooth traces are in the vertical direction, that is, orthogonal to the direction in which the rolling grooves 3 for the rolling members are elongated. And holes B1 for fixing bolts for fixing a component (or the rail) which pierce the guide rail 1 from the upper surface 1a to the bottom surface 1c are formed at predetermined intervals.

Two sliders 2 whose cross-sections look like U-shape movably engage with the guide rail 1, wherein these two sliders 2 are set to be close to each other on the guide rail 1. Each slider 2 consists of a slider main body 2A and end caps 2B attached to the front and rear ends of the slider main body 2A. As shown in FIG. 2, rolling grooves 5 for the loaded rolling members are provided on the inner side surfaces of both crotches of the slider 2 which straddle the guide rail 1, wherein the rolling grooves 5 for the loaded rolling members are formed to be opposite to respective rolling grooves 3 for the rolling members of the guide rail 1. And, inside the crotches of the slider main body 2A, return paths 6 for the rolling members which penetrate the slider main body 2A in the axial direction are formed in parallel with said rolling grooves 5 for the loaded rolling members. Half-annular-shaped curved paths 7 formed in respective end caps 2B communicate the rolling grooves 5 for the loaded rolling members with the return paths 6 for the rolling members in order to constitute endless circulation paths for the rolling members, in which a multitude of balls 8 serving as rolling members are disposed so that they can roll therein.

A plate 9 (for example, a base of a robot arm) is attached to the upper surfaces of said two sliders: the sliders 2 are fixed to the plate 9. A plate 10 on which a motor is mounted overhangs from the plate 9. A drive motor 11 mounted on the plate 10 has a pinion 12 around an output shaft 11a, which engages with the rack teeth 4 on the side surface of the guide rail 1. The holes B1 for the fixing bolts may be used to fix, for example, a mechanism unit of a gantry type robot (not shown) to the other end (with respect to the drive motor 11) of the guide rail 1.

Now, operation will be described.

Suppose the guide rail 1 shown in FIG. 1 is used as a robot arm of a gantry type robot, wherein the guide rail 1 can be shifted forward and backward, that is, the robot arm can be expanded and withdrawn, through the pinion 12 and the rack teeth 4 by rotating the drive motor 11 forward and backward. At that time, linear shifting of the guide rail 1 is remarkably smooth and exact because of rolling guide conducted by the balls of the sliders 2.

As the rack teeth 4 are directly worked in the guide rail 1, the system consists of fewer components than the system in which a separately manufactured rack is bolted to a guide rail, and labor can be saved because assembly or positioning of the rack is not required.

Figure 4:
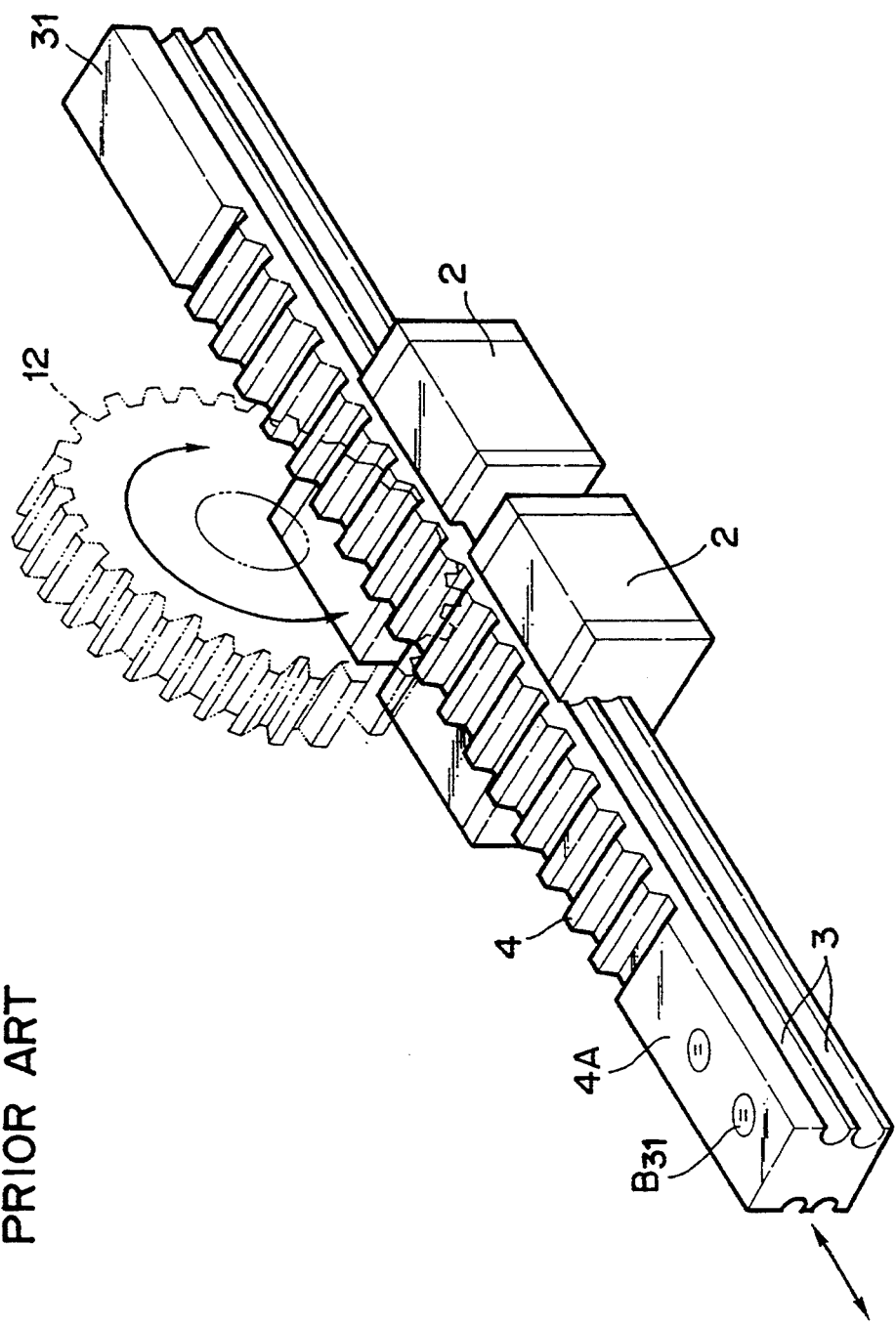
FIG. 4 is a perspective view of a prior art linear guide system with an integrally formed rack.

By contrast, in the prior art system, the rack teeth 4 are formed in the upper surface of the rail as shown in FIG. 4, and thus, the surface 4A on which a component is fixed should be formed at one end of the rack teeth 4, this embodiment does not need such a surface in order to fix the mechanism unit of the robot to the guide rail 1. Accordingly, the rail does not have to have the extra length for the surface on which the component is fixed, thereby further reducing space for installation as well as facilitating manufacture to reduce the cost.

As the rack teeth 4 formed on the side surface of the guide rail 1 engage with the pinion 12, assembly thereof is easier than in the prior art system in which the rack teeth formed on the top or bottom surface engages with the pinion. Moreover, since the direction of the deflection of the guide rail 1 with its self-weight is different from the direction of vibration generated from engagement of the driven rack teeth 4, less damage is given to the rack teeth 4 to prolong the life of the rack, the noise is reduced, and precision in positioning is improved.

Figure 3:
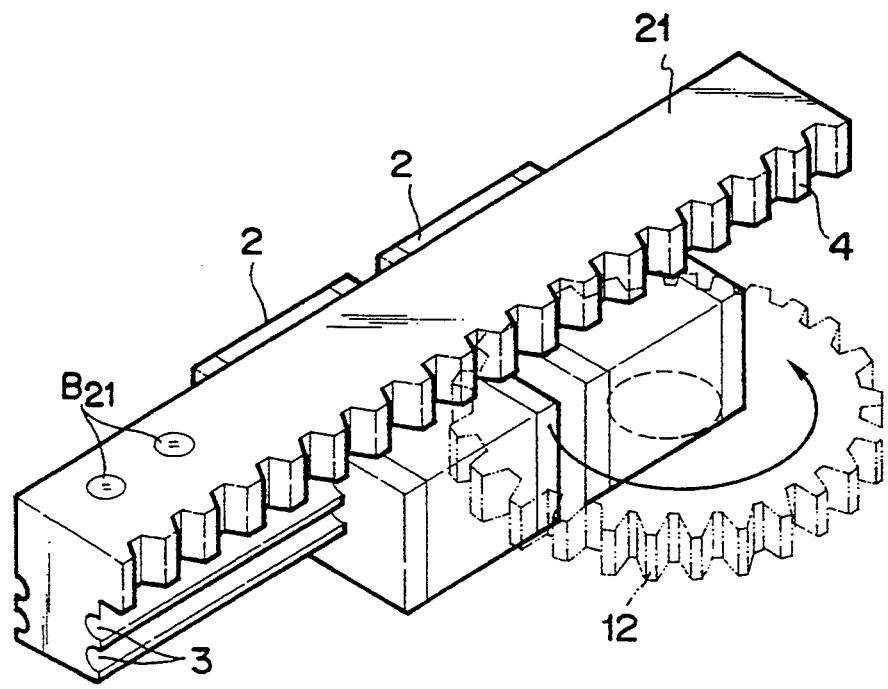
FIG. 3 is a perspective view of another embodiment according to the present invention.

In the above-mentioned embodiment, the guide rail 1 has the T-shaped cross-section whose base portion 1B has sideward projecting portions on both sides and the rack teeth 4 are provided along one of the side edge surfaces of said projecting portions of the base portion 1B. As an alternative, shown in FIG. 3, the base portion of a guide rail 21 may be L-shaped, that is, may have only one projecting portion on one side so that the rack teeth 4 are provided along the side edge surface of the projecting portion of the base portion.

Furthermore, though, in the illustrative embodiments, two rolling grooves 3 for the rolling members are formed in each side surface, either more grooves or just one groove may be formed in each side surface.

In addition, the rolling members are not limited to balls, but may be rollers.

As described above, according to the present invention, the rack teeth which constitute the rack and pinion mechanism are integrally formed on the side surface of the guide rail of the linear guide system, and the direction of the tooth traces of the rack teeth are orthogonal to the direction along which the rolling grooves for the rolling members of the guide rail are formed. Therefore, this system can obtain higher precision than the conventional systems in which a separately manufactured rack is bolted to a rail.

By providing the rolling grooves for the rolling members and the rack teeth on the same side surface of the guide rail, the holes for the fixing bolts can be formed over the overall length of the surfaces of the guide rail on which the rack teeth are not formed. As a result, fixation of the guide rail becomes fortified so that the guide rail does not vibrate with engagement of the rack teeth and the pinion gear, thereby realizing stable performance at a high speed.

When the sliders are fixed and the guide rail is shifted straight along the sliders, the surface for fixing a component to the moving guide rail does not have to be provided at the end of the rack teeth. Accordingly the length of the rail can be shortened. As a result, rigidity of the rail can increase and the space for installation can be reduced.

In addition, since the direction of the tooth traces of the rack teeth with the pinion gear is different from the direction of deflection of the rail with its self-weight, the engagement can be made uniform in the entire stroke. As a result, the system can realize the long life, low noise and high precision in positioning.

What is claimed is:

1. A linear guide system with an integrally formed rack comprising:
   a guide rail having opposite sides formed with rolling grooves elongated in the longitudinal direction of the guide rail for receiving rolling members;
   sliders which are mounted on the guide rail so as to enable relative sliding movement of said sliders and the guide rail, each slider including a slider main body having a recess portion with rolling grooves corresponding to said rolling grooves of the guide rail and having internal return paths parallel with said rolling grooves of said recess portion, and end caps attached to opposite longitudinal ends of the slider main body which have curved paths for connecting rolling paths formed by the rolling grooves of the slider main body and the corresponding grooves of the guide rail with corresponding return paths of the slider main body in order to form endless circulation paths; and
   a multitude of rolling members which are loaded for rolling in said endless circulation paths so as to reduce friction between the guide rail and the sliders during said relative sliding movement,
   wherein at least one of said opposite sides of the guide rail has rack teeth which are aligned in the longitudinal direction of the guide rail, with respective tooth traces of the rack teeth being orthogonal to the rolling grooves of the guide rail.

2. A linear guide system with an integrally formed rack according to claim 1,
   wherein said guide rail has an inverted-T-shaped cross-section.

3. A linear guide system with an integrally formed rack according to claim 1,
   wherein said guide rail has an L-shaped cross-section.

4. A linear guide system with an integrally formed rack according to claim 1, wherein the guide rail has a top surface and a bottom surface connected through said opposite sides, one of said top and bottom surfaces being received in said recess portion of each slider main body, and holes for receiving fixing means are formed on the other of said top and bottom surfaces.

5. A linear guide system with an integrally formed rack according to claim 4, wherein said holes are formed at predetermined intervals along substantially the entire length of the guide rail.

6. A linear guide system with an integrally formed rack according to claim 1, wherein said curved paths of said end caps are half-circular-arc-shaped.

7. A linear guide system with an integrally formed rack comprising:
   a guide rail having opposite sides formed with rolling grooves elongated in the longitudinal direction of the guide rail for receiving rolling members, each side having at least one rolling groove;
   a slider which is mounted on the guide rail so as to enable relative sliding movement of said slider and the guide rail, said slider including a slider main body having a recess portion with rolling grooves corresponding to said rolling grooves of the guide rail and having internal return paths parallel with said rolling grooves of said recess portion, and end caps attached to opposite longitudinal ends of the slider main body which have curved paths for connecting rolling paths formed by the rolling grooves of the slider main body and the corresponding grooves of the guide rail with corresponding return paths of the slider main body in order to form endless circulation paths; and
   a multitude of rolling members which are loaded for rolling in said endless circulation paths so as to reduce friction between the guide rail and the slider during said relative sliding movement,
   wherein at least one of said opposite sides of the guide rail has rack teeth which are aligned in the longitudinal direction of the guide rail, with respective tooth traces of the rack teeth being orthogonal to the rolling grooves of the guide rail.

8. A linear guide system with an integrally formed rack according to claim 7, wherein said guide rail has an inverted-T-shaped cross-section.

9. A linear guide system with an integrally formed rack according to claim 7, wherein said guide rail has an inverted-L-shaped cross-section.

10. A linear guide system with an integrally formed rack according to claim 7, wherein the guide rail has a top surface and a bottom surface connected through said opposite sides, one of said top and bottom surfaces being received in said recess portion of the slider main body, and holes for receiving fixing means are formed on the other of said top and bottom surfaces.

11. A linear guide system with an integrally formed rack according to claim 10, wherein said holes are formed at predetermined intervals along substantially the entire length of the guide rail.

* * * * *